(12) United States Patent
Koh et al.

(10) Patent No.: US 8,349,502 B2
(45) Date of Patent: Jan. 8, 2013

(54) ADDITIVE FOR NON-AQUEOUS ELECTROLYTE AND SECONDARY BATTERY USING THE SAME

(75) Inventors: Jeong Hwan Koh, Daejeon (KR); Yong Joon Ha, Daejeon (KR); Jin Hyun Park, Seoul (KR); Chul Haeng Lee, Daejeon (KR); Young Min Lim, Daejeon (KR); Jeong Ae Ahn, Daejeon (KR); Dmitry Pogozhev, Daejeon (KR)

(73) Assignee: LG Chem, Ltd., Seoul (KR)

( * ) Notice: Subject to any disclaimer, the term of this patent is extended or adjusted under 35 U.S.C. 154(b) by 460 days.

(21) Appl. No.: 12/311,121

(22) PCT Filed: Sep. 20, 2007

(86) PCT No.: PCT/KR2007/004583
§ 371 (c)(1),
(2), (4) Date: Mar. 19, 2009

(87) PCT Pub. No.: WO2008/035928
PCT Pub. Date: Mar. 27, 2008

(65) Prior Publication Data
US 2009/0280414 A1    Nov. 12, 2009

(30) Foreign Application Priority Data

Sep. 20, 2006   (KR) .................. 10-2006-0091268

(51) Int. Cl.
| | |
|---|---|
| H01M 6/16 | (2006.01) |
| C07C 303/00 | (2006.01) |
| C07C 307/00 | (2006.01) |
| C07C 309/00 | (2006.01) |
| C07C 311/00 | (2006.01) |
| C07D 321/00 | (2006.01) |
| C07D 323/00 | (2006.01) |
| C07D 407/00 | (2006.01) |
| C07D 493/00 | (2006.01) |

(52) U.S. Cl. ............ 429/338; 558/44; 558/52; 549/228; 549/229

(58) Field of Classification Search .................... 558/55, 558/50, 44, 52; 549/228, 229; 429/338
See application file for complete search history.

(56) References Cited

U.S. PATENT DOCUMENTS

| | | | | |
|---|---|---|---|---|
| 3,908,157 | A | * | 9/1975 | Ross et al. ................. 361/512 |
| 4,541,037 | A | * | 9/1985 | Ross et al. ................. 361/505 |
| 5,264,591 | A | * | 11/1993 | Bombardelli et al. ........ 549/214 |
| 5,326,885 | A | * | 7/1994 | Olivero et al. .............. 549/229 |
| 5,498,491 | A | * | 3/1996 | Golovin ..................... 429/314 |
| 6,127,546 | A | * | 10/2000 | Park et al. .................. 548/239 |
| 6,255,021 | B1 | * | 7/2001 | Kusumoto et al. ........... 429/328 |
| 7,728,069 | B2 | * | 6/2010 | Keul et al. .................. 525/54.1 |
| 2004/0224233 | A1 | * | 11/2004 | Chen et al. ................. 429/303 |
| 2005/0094352 | A1 | * | 5/2005 | Komatsu et al. ............ 361/504 |
| 2007/0171595 | A1 | * | 7/2007 | Komatsu et al. ............ 361/503 |
| 2007/0224514 | A1 | * | 9/2007 | Kotato et al. ............... 429/325 |
| 2008/0108144 | A1 | * | 5/2008 | Alam et al. ................. 436/66 |
| 2009/0023093 | A1 | * | 1/2009 | Lee et al. ................... 430/270.1 |
| 2009/0323156 | A1 | * | 12/2009 | Shin et al. .................. 359/265 |
| 2010/0219067 | A1 | * | 9/2010 | Koval et al. ................ 204/252 |
| 2010/0266905 | A1 | * | 10/2010 | Jeon et al. .................. 429/331 |
| 2011/0111305 | A1 | * | 5/2011 | Jeon et al. .................. 429/326 |
| 2011/0159377 | A1 | * | 6/2011 | Lee et al. ................... 429/306 |

FOREIGN PATENT DOCUMENTS

| | | |
|---|---|---|
| CN | 1518153 | 8/2004 |
| CN | 1862871 A | 11/2006 |
| JP | 11-339850 | 12/1999 |
| JP | 2001-151863 | 6/2001 |
| JP | 2004-235145 | 8/2004 |
| JP | 2005-108520 | 4/2005 |
| JP | 2005-149750 | 6/2005 |
| JP | 2005-228631 | 8/2005 |
| JP | 2005-251677 | 9/2005 |
| JP | 2007-042387 | 2/2007 |
| KR | 10-2001-0068820 A | 7/2001 |
| KR | 10-2002-0086069 A | 11/2002 |
| KR | 10-2007-0031807 A | 3/2007 |

\* cited by examiner

*Primary Examiner* — Liam Heincer
(74) *Attorney, Agent, or Firm* — McKenna Long & Aldridge LLP

(57) ABSTRACT

Disclosed is an electrolyte comprising a compound having both a sulfonate group and a cyclic carbonate group. The electrolyte forms a more stable and dense SEI layer on the surface of an anode, and thus improves the capacity maintenance characteristics and lifespan characteristics of a battery. Also, disclosed is a compound represented by the following Formula 1, and a method for preparing the same by reacting 4-(hydroxyalkyl)-1,3-dioxolan-2-one with a sulfonyl halide compound:

[Formula 1]

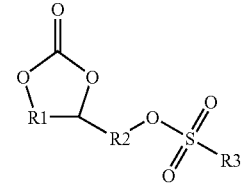

wherein each of R1 and R2 independently represents a $C_1$~$C_6$ alkylene group optionally containing a $C_1$~$C_6$ alkyl group or $C_2$~$C_6$ alkenyl group introduced thereto; R3 is selected from the group consisting of a hydrogen atom, $C_1$~$C_{20}$ alkyl group, $C_3$~$C_8$ cyclic alkyl group, $C_2$~$C_6$ alkenyl group, halo-substituted alkyl group, phenyl group and benzyl group.

6 Claims, 1 Drawing Sheet

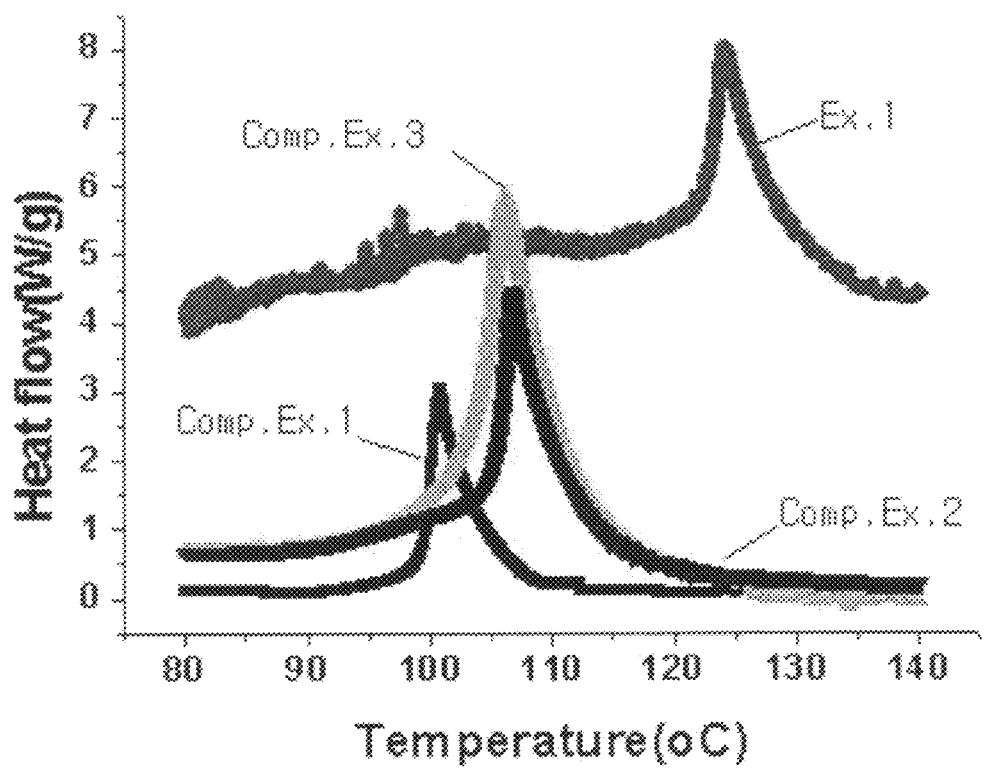

ADDITIVE FOR NON-AQUEOUS ELECTROLYTE AND SECONDARY BATTERY USING THE SAME

TECHNICAL FIELD

The present invention relates to a non-aqueous electrolyte and a secondary battery comprising the same. More particularly, the present invention relates to a non-aqueous electrolyte comprising a compound capable of improving the capacity maintenance characteristics and lifespan characteristics of a secondary battery, and a secondary battery comprising the same.

BACKGROUND ART

Recently, as electronic appliances have been downsized and lightened, it has been required to downsize and lighten batteries serving as power sources for electronic appliances. As a compact, low-weight and high-capacity rechargeable battery, a lithium secondary battery has been commercialized and used widely in portable electronic and communication instruments, such as compact video cameras, portable phones, notebook computers, etc.

A lithium secondary battery comprises a cathode, an anode, a separator and a non-aqueous electrolyte containing an electrolyte salt and an electrolyte solvent.

With regard to the operation and use of a battery, the non-aqueous electrolyte is required to have the following characteristics. First, the non-aqueous electrolyte should serve to transfer lithium ions between the cathode and the anode upon the lithium ion intercalation/deintercalation in the two electrodes. Next, the non-aqueous electrolyte should be electrochemically stable under the potential difference between the cathode and the anode and have little possibility of side reactions, such as the decomposition of the electrolyte.

However, an electrode comprising a carbonaceous material and another electrode formed of a lithium metal compound, generally used as an anode and a cathode for a battery, show a difference in the potentials of about 3.5~4.3V. Under the potential difference, a conventional electrolyte solvent, such as a carbonate-based organic solvent, may be decomposed on the surface of an electrode during repeated charge/discharge cycles, thereby causing a side reaction inside the battery. Additionally, organic solvents, such as propylene carbonate (PC), dimethyl carbonate (DMC) or diethyl carbonate (DEC) may be co-intercalated into a gap between graphite layers of an anode comprising a carbonaceous material, resulting in a structural collapse of the anode.

Meanwhile, it has been known that the above problems could be solved by a solid electrolyte interface (SEI) layer formed on the surface of an anode via the electrical reduction of a carbonate-based organic solvent upon the initial charge of the battery. However, lithium ions in the electrolyte irreversibly participate in the formation of the SEI layer, resulting in a drop in the capacity of the battery. Particularly, the SEI layer is not electrochemically or thermally stable, and thus may be easily broken down by electrochemical energy and heat energy increasing with the lapse of time during repeated charge/discharge cycles. Therefore, the battery may show a drop of the capacity during repeated charge/discharge cycles due to the continuous regeneration of the SEI layer, and may undergo degradation of its lifespan characteristics.

Further, side reactions, such as the decomposition of the electrolyte, may occur on the surface of the anode exposed due to the collapse of the SEI layer, and the gases generated upon the side reactions result in a battery swelling phenomenon or an increase in the internal pressure of the battery.

To solve the aforementioned problems, methods of adding 1,3-propanesultone (Japanese Patent Application No. 1999-339850) or 1,3-propenesultone (Japanese Patent Application No. 2001-151863) to an electrolyte have been suggested. However, even when applying such methods, batteries undergo a gradual drop in their capacities as they are subjected to charge/discharge cycles continuously. Therefore, the aforementioned problems still remain unsolved.

DISCLOSURE

Technical Problem

Therefore, the present invention has been made in view of the above-mentioned problems. It is an object of the present invention to improve the capacity maintenance characteristics and lifespan characteristics of a battery by using a compound having both a sulfonate group and a cyclic carbonate group as a component of an electrolyte so as to form a more stable and dense SEI layer on the surface of an anode.

Technical Solution

In order to achieve the above-mentioned object, the present invention provides an electrolyte for a secondary battery, the electrolyte comprising an electrolyte salt and an electrolyte solvent, and further comprising a compound having both a sulfonate group and a cyclic carbonate group. The present invention also provides a secondary battery using the same electrolyte.

Additionally, the present invention provides an electrode having a solid electrolyte interface (SEI) layer partially or totally formed on a surface thereof, the SEI layer being formed via electrical reduction and polymerization of a compound having both a sulfonate group and a cyclic carbonate group. The present invention also provides a secondary battery using the same electrode.

Further, the present invention provides a compound represented by the following Formula 1, and a method for preparing a compound represented by the following Formula 1, the method comprising a step of reacting 4-(hydroxyalkyl)-1,3-dioxolan-2-one with a sulfonyl halide compound:

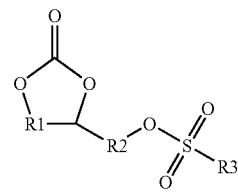

[Formula 1]

wherein each of R1 and R2 independently represents a $C_1$~$C_6$ alkylene group optionally containing a $C_1$~$C_6$ alkyl group or $C_2$~$C_6$ alkenyl group introduced thereto; R3 is selected from the group consisting of a hydrogen atom, $C_1$~$C_{20}$ alkyl group, $C_3$~$C_8$ cyclic alkyl group, $C_2$~$C_6$ alkenyl group, halo-substituted alkyl group, phenyl group and benzyl group.

Hereinafter, the present invention will be explained in more detail.

The present invention is characterized by using a compound having both a sulfonate group and a cyclic carbonate group as a component of an electrolyte to form a more stable and dense solid electrolyte interface (SEI) layer on the surface of an anode. The mechanism for the formation of such an SEI layer may be explained as follows but is not limited thereto.

The compound having both a sulfonate group and a cyclic carbonate group undergoes electrical reduction and polymerization during the initial charge of the battery to form an SEI layer on the surface of the anode. More particularly, when the compound is electrically reduced, sulfonate radical ($-SO_3^-$) and radical of the substituent introduced into the sulfonate group of the compound ($R_3^-$) may be formed first, and the $-SO_3^-$ radical are bound to lithium ions in the electrolyte to form lithium sulfonate radical ($-SO_3^-Li^+$). Additionally, the $-SO_3^-Li^+$ radical are coordinated with oxygen atoms of the adjacent cyclic carbonate groups to form a chelate compound functioning as a reducing agent for carrying out ring opening of the cyclic carbonate group, and thus facilitate the formation of the carbonate-derived radical ($-CO_3^-$). In other words, according to the present invention, a large number of highly reactive radicals are produced as described above, and various types of polymerization reactions can occur on the surface of the anode along with lithium ions or other components of the electrolyte. As a result, the present invention allows the formation of a more stable and dense polymeric SEI layer as compared to an SEI layer formed by a conventional carbonate-based organic solvent, and thus provides a battery with improved capacity maintenance characteristics and lifespan characteristics.

Additionally, the present invention allows earlier formation of an SEI layer. Because sulfonate groups can be reduced in advance of carbonate groups, the compound according to the present invention starts to form an SEI layer earlier than a conventional electrolyte. Further, according to the present invention, the formation of a large amount of radicals ($R_3^-$, $-SO_3^-$ and $-CO_3^-$) can accelerate the polymerization for forming the SEI layer. As a result, the present invention permits early completion in the formation of the SEI layer.

There is no particular limitation in the above compound, as long as the compound has both a sulfonate group and a cyclic carbonate group.

Additionally, the number of carbon atoms by which the sulfonate group are linked to the cyclic carbonate group may significantly affect the aforementioned mechanism of radical formation. In other words, when the sulfonate group is directly bonded to the cyclic carbonate group, a four-member ring may be formed, while $-SO_3^-Li^+$ radical forms coordination bond with the oxygen atoms of the cyclic carbonate group and functions as a reducing agent for the cyclic carbonate group, wherein the four-member ring is formed between $-SO_3^-Li^+$ and C—O of the carbonate group as illustrated in the following Formula. However, in general, such a four-member ring is not chemically stable, and thus makes it difficult for $-SO_3^-Li^+$ to function as a reducing agent due to the unstable structure. Accordingly, this adversely affects the subsequent formation of carbonate-derived radical ($-CO_3^-$). Meanwhile, when the sulfonate group is linked to the cyclic carbonate group via a $C_7$ or higher alkylene group, a ten-member or higher-member ring should be formed between $-SO_3^-Li^+$ and C—O of the carbonate group in order to allow the $-SO_3^-Li^+$ radicals to form coordination bonds with the oxygen atoms of the cyclic carbonate group and to function as a reducing agent for the cyclic carbonate group. However, it is generally difficult to chemically form a ten-member or higher-member ring.

Thus, in this case, it is difficult to form carbonate-derived radicals. Therefore, according to the present invention, the sulfonate group and the cyclic carbonate group are linked preferably via a lower alkylene group, such as a $C_1$~$C_6$ alkylene group, so that a chemically stable five-member to ten-member ring can be formed between $-SO_3^-Li^+$ and C—O of the carbonate group:

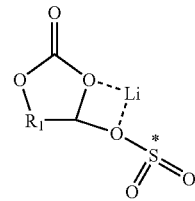

Additionally, the sulfonate group is preferably substituted with at least one electron-withdrawing group (EWG), allyl group or benzyl group in order to facilitate the radical formation. Non-limiting examples of the electron-withdrawing group include halogen atoms (F, Cl, Br, I), cyano group (CN), nitro group ($NO_2$), trifluoromethane group ($CF_3$), pentafluoroethane group ($C_2F_5$), trifluoromethanesulfonyl group ($SO_2CF_3$), pentafluoroethanesulfonyl group ($SO_2C_2F_5$), trifluoromethanesulfonate group ($SO_3CF_3$), pentafluoroethanesulfonate group ($SO_3C_2F_5$), pentafluorophenyl ($C_6F_5$), acetyl group ($COCH_3$), ethyl ketone group ($COC_2H_5$), propyl ketone group ($COC_3H_7$), butyl ketone group ($COC_4H_9$), pentyl ketone group ($CO_2C_5H_{11}$), hexyl ketone group ($COC_6H_{13}$), ethanoate group ($CO_2CH_3$), propanoate group ($CO_2C_2H_5$), butanoate group ($CO_2C_3H_7$), pentanoate group ($CO_2C_4H_9$), hexanoate group ($CO_2C_5H_{11}$), or the like.

The compound having both a sulfonate group and a cyclic carbonate group according to the present invention may be represented by the following Formula 1:

[Formula 1]

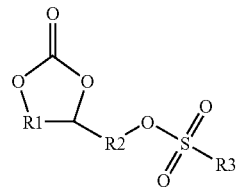

wherein each of R1 and R2 independently represents a $C_1$~$C_6$ alkylene group optionally containing a $C_1$~$C_6$ alkyl group or $C_2$~$C_6$ alkenyl group introduced thereto; R3 is selected from the group consisting of a hydrogen atom, $C_1$~$C_{20}$ alkyl group, $C_3$~$C_8$ cyclic alkyl group, $C_2$~$C_6$ alkenyl group, halo-substituted alkyl group, phenyl group and benzyl group.

Non-limiting examples of the compound include 1,3-dioxolan-2-onylmethyl allyl sulfonate, 1,3-dioxolan-2-onylmethyl methyl sulfonate, 1,3-dioxolan-2-onylmethyl ethyl sulfonate, 1,3-dioxolan-2-onylmethyl propyl sulfonate, 1,3-dioxolan-2-onylmethyl butyl sulfonate, 1,3-dioxolan-2-onylmethyl pentyl sulfonate, 1,3-dioxolan-2-onylmethyl hexyl sulfonate, 1,3-dioxolan-2-onylmethyl cyclopentyl sulfonate, 1,3-dioxolan-2-onylmethyl cyclohexyl sulfonate, 1,3-dioxolan-2-onylmethyl cycloheptyl sulfonate, 1,3-dioxolan-2-onylmethyl trifluoromethyl sulfonate, 1,3-dioxolan-2-onylmethyl trifluoroethyl sulfonate, 1,3-dioxolan-2-onylmethyl benzyl sulfonate, 1,3-dioxolan-2-onylmethyl phenyl sulfonate, 1,3-dioxolan-2-onylmethyl para-chlorophenyl sulfonate, 1,3-dioxolan-2-onylethyl allyl sulfonate, 1,3-dioxolan-2-onylethyl methyl sulfonate, 1,3-dioxolan-2- onylethyl cyclopentyl sulfonate, 1,3-dioxolan-2-onylethyl cyclohexyl sulfonate, 1,3-dioxolan-2-onylethyl trifluoromethyl sulfonate, 1,3-dioxolan-2-onylethyl trifluoroethyl sulfonate, 1,3-dioxolan-2-onylethyl benzyl sulfonate, 1,3-dioxolan-2-onylethyl phenyl sulfonate, 1,3-dioxolan-2-onylethyl para-chlorophenyl sulfonate, 1,3-dioxan-2-only-4-methyl allyl sulfonate, 1,3-dioxan-2-only-4-methyl methyl sulfonate, 1,3-dioxan-2-only-4-methyl cyclopentyl sulfonate, 1,3-dioxan-2-only-4-methyl cyclohexyl sulfonate, 1,3-dioxan-2-only-4-methyl trifluoromethyl sulfonate, 1,3-dioxan-2-only-4-methyl trifluoroethyl sulfonate, 1,3-dioxan-2-only-4-methyl benzyl sulfonate, 1,3-dioxan-2-only-4-methyl phenyl sulfonate, 1,3-dioxolan-2-only-4-methyl para-chlorophenyl sulfonate or the like.

In the electrolyte provided according to the present invention, the compound having both a sulfonate group and a cyclic carbonate group is used in a controlled amount so as to obtain a desired degree of improvement in the quality of a battery. Preferably, the compound is used in an amount of 0.1~30 parts by weight per 100 parts by weight of the electrolyte. If the compound is used in an amount of less than 0.1 parts by weight, it is not possible to obtain sufficient cycle maintenance characteristics. If the compound is used in an amount of greater than 30 parts by weight, the battery may show an increased electric resistance.

The electrolyte for a battery, to which the compound having both a sulfonate group and a cyclic carbonate group is added according to the present invention, further may comprise conventional components widely known to one skilled in the art, for example, an electrolyte salt and an electrolyte solvent.

The electrolyte salt that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_3^-$, $N(CF_3SO_2)_2^-$, $C(CF_2SO_2)_{3-}$ and combinations thereof. A lithium salt is particularly preferred.

Additionally, the electrolyte solvent that may be used in the present invention includes conventional organic solvents generally known to those skilled in the art, such as cyclic carbonates and/or linear carbonates.

Particularly, it is preferred to use a cyclic carbonate with a high polarity in order to increase the lithium ion dissociation and conduction capability of the electrolyte. More preferably, a cyclic carbonate is used in combination with a linear carbonate in order to prevent a drop in the lithium ion conductivity caused by an increase in the viscosity of the electrolyte, and thus to improve the lifespan characteristics of the battery. Non-limiting examples of the electrolyte solvents include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethyoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate or halogen derivatives thereof. Such electrolyte solvents may be used alone or in combination. For example, ethylene carbonate may be used in combination with propylene carbonate to solve the problem of degradation in the low-temperature characteristics of ethylene carbonate.

Additionally, the present invention provides an electrode having a solid electrolyte interface (SEI) layer partially or totally formed on a surface thereof, the SEI layer being formed via electrical reduction and polymerization of a compound having both a sulfonate group and a cyclic carbonate group. The electrode can be obtained by subjecting to at least one charge/discharge cycle after assembling a unit cell using an electrode manufactured by a conventional method known to one skilled in the art and an electrolyte comprising the compound having both a sulfonate group and a cyclic carbonate group, so that a SEI film can be formed on the surface of the electrode active material. In a variant, before assembling a unit cell, an electrode manufactured by a conventional method known to one skilled in the art is subjected to electrical reduction while the electrode is dipped into an electrolyte comprising the compound having both a sulfonate group and a cyclic carbonate group, so as to obtain an electrode having a preliminarily formed SEI film thereon.

The electrode having no SEI film can be obtained by a conventional method known to one skilled in the art. In one embodiment of such conventional methods, electrode slurry is prepared by mixing and agitating an electrode active material and a solvent optionally with a binder, a conductive agent and a dispersant, and then the slurry is applied (coated) onto a metallic current collector, followed by compressing and drying.

Anode active material may include any conventional anode active materials currently used in an anode of a conventional secondary battery. Particular non-limiting examples of the anode active materials include lithium metal, lithium alloys, carbon, petroleum coke, activated carbon, graphite or other carbonaceous materials. Particularly, it is preferred to use graphitized carbon that has an interlayer distance constant d002 of carbon layers of at most 0.338 nm and shows a specific surface area of at most 10 $m^2/g$ as measured by the BET method. Non-limiting examples of an anode current collector include foil formed of copper, gold, nickel, copper alloys or a combination thereof.

Further, the secondary battery according to the present invention includes an electrolyte comprising the compound having both a sulfonate group and a cyclic carbonate group, and/or an electrode having a solid electrolyte interface (SEI) layer partially or totally formed on a surface thereof, the SEI layer being formed via electrical reduction and polymerization of a compound having both a sulfonate group and a cyclic carbonate group. Preferably, the present invention provides a secondary battery comprising: a separator; a cathode; an anode having a solid electrolyte interface (SEI) layer partially or totally formed on a surface thereof, the SEI layer being formed via electrical reduction and polymerization of a compound having both a sulfonate group and a cyclic carbonate group; and/or an electrolyte comprising the above compound.

Non-limiting examples of the secondary battery include a lithium metal secondary battery, a lithium ion secondary battery, a lithium polymer secondary battery or a lithium ion polymer secondary battery.

There is no particular limitation in the cathode that may be applied to the secondary battery according to the present invention. The cathode may be a conventional electrode comprising a cathode active material bound to a cathode current collector. Particularly, cathode active material may include any conventional cathode active materials currently used in a cathode of a conventional secondary battery. Particular non-limiting examples of the cathode active material include: lithium transition metal composite oxides, including $LiM_xO_y$, (wherein M=Co, Ni, Mn, $Co_aNi_bMn_c$), such as lithium manganese composite oxides (e.g. $LiMn_2O_4$), lithium nickel oxides (e.g. $LiNiO_2$), lithium cobalt oxides (e.g. $LiCoO_2$), or other oxides containing other transition metals partially substituting for manganese, nickel and cobalt; chalcogenide (e.g. manganese dioxide, titanium disulfide, molybdenum disulfide, etc.); or the like. Among these examples, $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, $a+b+c=1$), $LiNi_{1-y}Co_yO_2$, $LiCO_{1-y}Mn_yO_2$, $LiNi_{1-y}Mn_yO_2$ (wherein $0\leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (wherein $0<Z<2$), $LiCoPO_4$, $LiFePO_4$ or a mixture thereof is particularly preferred. Non-limiting examples of a cathode current collector include foil formed of aluminum, nickel or a combination thereof.

There is no particular limitation in the separator. A porous separator may be used. Non-limiting examples of the separator that may be used include a polypropylene-based, polyethylene-based or polyolefin-based separator.

The secondary battery according to the present invention may be obtained by using a conventional method known to those skilled in the art. For example, a separator is inserted between a cathode and an anode to form an electrode assembly, and then an electrolyte is injected thereto.

There is no particular limitation in the outer shape of the secondary battery obtained in the above-described manner. The secondary battery may be a cylindrical, prismatic, pouch-type or coin-type battery.

Further, the present invention provides a compound represented by the following Formula 1:

[Formula 1]

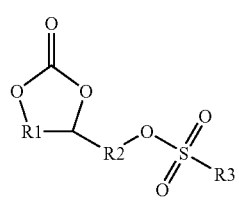

wherein each of R1 and R2 independently represents a $C_1$~$C_6$ alkylene group optionally containing a $C_1$~$C_6$ alkyl group or $C_2$~$C_6$ alkenyl group introduced thereto; R3 is selected from the group consisting of a hydrogen atom, $C_1$~$C_{20}$ alkyl group, $C_3$~$C_8$ cyclic alkyl group, $C_2$~$C_6$ alkenyl group, halo-substituted alkyl group, phenyl group and benzyl group.

The compound represented by Formula 1 may be prepared by reacting 4-(hydroxyalkyl)-1,3-dioxolan-2-one with a sulfonyl halide compound, as shown in the following Formula 2. In Formula 2, X is a halogen atom (F, Cl, Br, I).

[Formula 2]

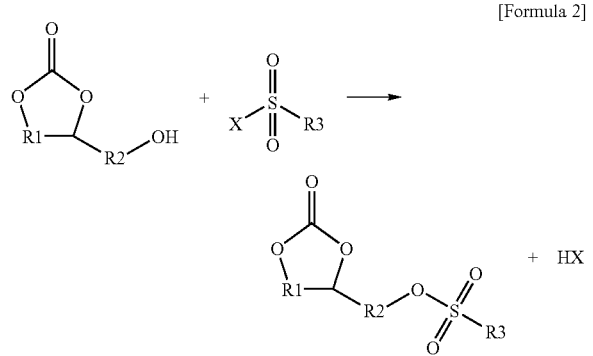

BRIEF DESCRIPTION OF THE DRAWING

The foregoing and other objects, features and advantages of the present invention will become more apparent from the following detailed description when taken in conjunction with the accompanying drawing in which:

FIG. 1 is a graph showing the DSC (differential scanning calorimetry) result according to Experimental Examples 2.

MODE FOR INVENTION

Reference will now be made in detail to the preferred embodiments of the present invention. It is to be understood that the following examples are illustrative only and the present invention is not limited thereto.

EXAMPLE 1

Example 1-1

Preparation of 1,3-dioxolan-2-onylmethyl allyl sulfonate

To 500 mL of acetonitrile ($CH_3CN$), 50 g (0.42 moles) of 4-(hydroxymethyl)-1,3-dioxolan-2-one and 57.5 g (0.42 moles) of allylsulfonyl chloride were introduced under agitation. To the resultant mixture, 58.5 mL (0.42 moles) of triethylamine were gradually added dropwise, and the reaction mixture was agitated at room temperature for 24 hours to perform a reaction (see the following Formula 3).

[Formula 3]

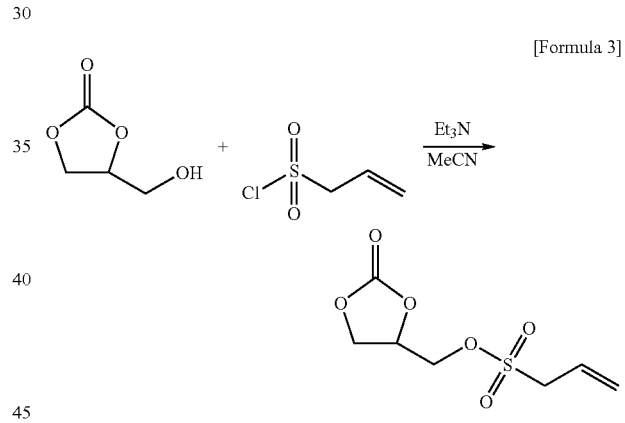

After the reaction mixture was diluted with 500 mL of water, the organic layer was extracted with ethyl acetate (EtOAc), and sodium sulfate ($Na_2SO_4$) was added thereto to remove the remaining water. Then, the reaction mixture was concentrated in a rotary evaporator and purified by silica gel chromatography.

After the purification, 75.5 g of 1,3-dioxolan-2-onylmethyl allyl sulfonate was obtained (yield 81'), and the structure was identified by NMR and mass spectroscopy.

$^1$H NMR (400 MHz, $CDCl_3$): δ 5.85 (m, 1H), 5.53 (m, 2H), 5.02 (m, 1H), 4.60 (t, J=9.2 Hz, 1H), 4.50 (dd, J=12 Hz, J=2.8 Hz, 1H), 4.36 (m, 2H), 3.95 (d, J=7.2, 2H).

$^{13}$C NMR (100 MHz, $CDCl_3$): δ 155.1, 125.8, 124.2, 74.2, 68.9, 66.1, 55.2. MS (EI) (calculated for $C_7H_{10}O_6S$, 222; Found: 222).

Example 1-2

Preparation of Electrolyte

To 100 parts by weight of a solution comprising 1M $LiPF_6$ in a mixed solvent containing ethylene carbonate, propylene carbonate and diethyl carbonate in a volume ratio of 1:1:2, 2 parts by weight of 1,3-dioxolan-2-onylmethyl allyl sulfonate obtained as described in Example 1-1 was added to provide an electrolyte.

Example 1-3

Manufacture of Battery

First, 93 parts by weight of an graphitized carbon active material and 7 parts by weight of polyvinylidene difluoride (PVDF) were introduced into N-methyl-2-pyrrolidone as a solvent, and the mixture was further mixed for 2 hours in a mixer. Then, the resultant slurry was coated onto a copper foil collector, followed by drying at 13° C., to provide an anode. Next, 91 parts by weight of $LiCoO_2$, 3 parts by weight of PVDF and 6 parts by weight of conductive carbon were mixed in N-methyl-2-pyrrolidone as a solvent for 2 hours by using a mixer. Then, the resultant slurry was coated onto an aluminum foil collector, followed by drying at 130° C., to provide a cathode. The cathode was cut into a circular shape and introduced into a coin-like can. A separator (celgard 2400) was stacked thereon and an anode cut into a circular shape was further stacked thereon. The resultant assembly was impregnated sufficiently with the electrolyte obtained as described in Example 1-2, and the can was covered with a coin-like cap, followed by pressing, to provide a coin-like battery.

EXAMPLE 2

An electrolyte and a secondary battery were provided in the same manner as described in Examples 1-2 and 1-3, except that 1,3-dioxolan-2-onylmethyl allyl sulfonate was added to the electrolyte in an amount of 0.5 parts by weight instead of 2 parts by weight.

EXAMPLE 3

An electrolyte and a secondary battery were provided in the same manner as described in Examples 1-2 and 1-3, except that 1,3-dioxolan-2-onylmethyl allyl sulfonate was added to the electrolyte in an amount of 6.0 parts by weight instead of 2 parts by weight.

EXAMPLE 4

An electrolyte and a secondary battery were provided in the same manner as described in Examples 1-2 and 1-3, except that 1,3-dioxolan-2-onylmethyl allyl sulfonate was added to the electrolyte in an amount of 10.0 parts by weight instead of 2 parts by weight.

EXAMPLE 5

An electrolyte and a secondary battery were provided in the same manner as described in Examples 1-2 and 1-3, except that 2 parts by weight of 1,3-dioxolan-2-onylmethyl benzyl sulfonate was added to the electrolyte instead of 1,3-dioxolan-2-onylmethyl allyl sulfonate.

EXAMPLE 6

An electrolyte and a secondary battery were provided in the same manner as described in Examples 1-2 and 1-3, except that 2 parts by weight of 1,3-dioxolan-2-onylmethyl trifluoromethyl sulfonate was added to the electrolyte instead of 1,3-dioxolan-2-onylmethyl allyl sulfonate.

COMPARATIVE EXAMPLE 1

An electrolyte was provided in the same manner as described in Example 1, except that no additive was added to the electrolyte.

COMPARATIVE EXAMPLE 2

An electrolyte and a secondary battery were provided in the same manner as described in Examples 1-2 and 1-3, except that 2 parts by weight of 1,3-propanesultone was added to the electrolyte instead of 1,3-dioxolan-2-onylmethyl allyl sulfonate.

COMPARATIVE EXAMPLE 3

An electrolyte and a secondary battery were provided in the same manner as described in Examples 1-2 and 1-3, except that 2 parts by weight of 4-fluoro-1,3-dioxolan-2-one was added to the electrolyte instead of 1,3-dioxolan-2-onylmethyl allyl sulfonate.

EXPERIMENTAL EXAMPLE 1

Evaluation of Quality of Lithium Secondary Battery

Each of the secondary batteries according to Examples 1~6 and Comparative Examples 1~3 was charged to 4.2V at a rate of 0.5 C under a temperature of 25° C., further charged under 4.2V until the current reached 0.05 mA or lower, and then discharged to 3V at a rate of 0.5 C to perform a charge/discharge test. The discharge capacity maintenance was expressed as a percent ratio of the discharge capacity after 50 cycles to the initial discharge capacity. The results are shown in the following Table 1.

TABLE 1

|  | Additive for electrolyte | Amount (parts by weight) | Electrolyte composition (volume ratio) | Discharge capacity maintenance (%) |
| --- | --- | --- | --- | --- |
| Ex. 1-3 | 1,3-dioxolan-2-onylmethyl allyl sulfonate | 2.0 | 1M LiPF6 EC:PC:DEC = 1:1:2 | 89.3 |
| Ex. 2 | 1,3-dioxolan-2-onylmethyl allyl sulfonate | 0.5 | 1M LiPF6 EC:PC:DEC = 1:1:2 | 81.2 |
| Ex. 3 | 1,3-dioxolan-2-onylmethyl allyl sulfonate | 6.0 | 1M LiPF6 EC:PC:DEC = 1:1:2 | 88.7 |

TABLE 1-continued

| | Additive for electrolyte | Amount (parts by weight) | Electrolyte composition (volume ratio) | Discharge capacity maintenance (%) |
|---|---|---|---|---|
| Ex. 4 | 1,3-dioxolan-2-onylmethyl allyl sulfonate | 10 | 1M LiPF6 EC:PC:DEC = 1:1:2 | 86.1 |
| Ex. 5 | 1,3-dioxolan-2-onylmethyl benzyl sulfonate | 2.0 | 1M LiPF6 EC:PC:DEC = 1:1:2 | 86.2 |
| Ex. 6 | 1,3-dioxolan-2-onylmethyl trifluoromethyl sulfonate | 2.0 | 1M LiPF6 EC:PC:DEC = 1:1:2 | 85.6 |
| Comp. Ex. 1 | — | — | 1M LiPF6 EC:PC:DEC = 1:1:2 | 73.2 |
| Comp. Ex. 2 | 1,3-propanesultone | 2.0 | 1M LiPF6 EC:PC:DEC = 1:1:2 | 82.2 |
| Comp. Ex. 3 | 4-fluoro-1,3-dioxolan-2-one | 2.0 | 1M LiPF6 EC:PC:DEC = 1:1:2 | 83.1 |

After the experiment, it can be seen that each of the batteries of Examples 1~6 using a compound having both a sulfonate group and a cyclic carbonate group according to the present invention shows a higher discharge capacity maintenance as compared to the battery using an electrolyte containing no additive according to Comparative Example 1.

Additionally, each of the batteries of Examples 1~6 shows a higher discharge capacity maintenance as compared to the batteries using a compound having each of the above functional groups alone, i.e. the battery using a sulfonate-based compound alone (Comparative Example 2) and the battery using a cyclic carbonate-based compound alone (Comparative Example 3). This demonstrates that the electrolyte comprising a compound having both a sulfonate group and a cyclic carbonate group forms a more stable SEI layer on the surface of the anode, and thus improves the capacity maintenance characteristics and lifespan characteristics of the battery.

EXPERIMENTAL EXAMPLE 2

Investigation of SEI Film Formation on Anode via Reaction of Additive

Each of the secondary batteries obtained from Example 1 and Comparative Examples 1~3 was subjected to three times of charge/discharge cycles under 0.2 C at 23° C., each battery was disassembled, and then the anode was collected from each battery in a discharged state. The anode was analyzed by DSC (differential scanning calorimetry). The results are shown the following FIG. 1. It is generally thought that the heat emission peak is the result of the thermal decomposition of the SEI film on the surface of the anode.

After the experiment, exothermic behavior of an anode varies depending on the electrolytes according to Example 1 and Comparative Examples 1~3 (see FIG. 1). It can be seen from the above experimental results that the compound having both a sulfonate group and a cyclic carbonate group, which is used as a component of electrolyte according to the present invention, participates in the formation of the SEI film on an anode.

In addition, the battery of Examples 1 using a compound having both a sulfonate group and a cyclic carbonate group according to the present invention shows a higher heat emission peak temperature, as compared to the battery of Comparative Example 1 using no additive for an electrolyte and the batteries of Comparative Example 2, 3 using a compound having each of the above functional groups (i.e. sulfonate group, cyclic carbonate group). It is generally thought that a higher heat emission peak temperature in a DSC graph demonstrates more excellent thermal stability of the SEI film formed on the surface of an anode. Therefore, it can be seen that the SEI film formed by the compound having both a sulfonate group and a cyclic carbonate group according to the present invention shows excellent thermal stability.

Industrial Applicability

As can be seen from the foregoing, the electrolyte for a secondary battery according to the present invention forms a more stable and dense SEI layer on the surface of an anode, and thus improves the capacity maintenance characteristics and lifespan characteristics of a secondary battery.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A non-aqueous electrolyte for a secondary battery, the electrolyte comprising an electrolyte salt, an electrolyte solvent, and a compound having both a sulfonate group and a cyclic carbonate group;
    wherein the sulfonate group is substituted with at least one selected from the group consisting of halogen atoms, cyano group (CN), trifluoromethane group ($CF_3$), pentafluoroethane group ($C_2F_5$), trifluoromethane-sulfonyl group ($SO_2CF_3$), pentafluoroethanesulfony group ($SO_2C_2F_5$), trifluoro-methanesulfonate group ($SO_3CF_3$), pentafluoroethanesulfonate group ($SO_3C_2F_5$), pentafluorophenyl ($C_6F_5$), acetyl group ($COCH_3$), ethyl ketone group ($COC_2H_5$), propyl ketone group ($COC_3H_7$), butyl ketone group ($COC_4H_9$), pentyl ketone group ($COC_5H_{11}$), hexyl ketone group ($COC_6H_{13}$), ethanoate group ($CO_2CH_3$), propanoate group ($CO_2C_2H_5$), butanoate group ($CO_2C_3H_7$), pentanoate group ($CO_2C_4H_9$), hexanoate group ($CO_2C_5H_{11}$), a hydrogen atom C1~C20 alkyl group, C3~C8 cyclic alkyl group, C2~C6 alkenyl group, halo-substituted alkyl group, and benzyl group,
    wherein the secondary battery is a lithium secondary battery, and
    wherein the electrolyte solvent is an organic solvent.

2. The non-aqueous electrolyte as claimed in claim 1, wherein the compound is represented by the following Formula 1:

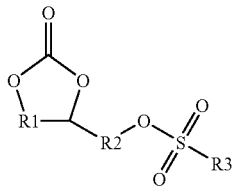

[Formula 1]

wherein each of R1 and R2 independently represents a $C_1$~$C_6$ alkylene group optionally containing a $C_1$~$C_6$ alkyl group or $C_2$~$C_6$ alkenyl group introduced thereto; R3 is selected from the group consisting of a hydrogen atom, $C_1$~$C_{20}$ alkyl group, $C_3$~$C_8$ cyclic alkyl group, $C_2$~$C_6$ alkenyl group, halo-substituted alkyl group, and benzyl group.

3. The non-aqueous electrolyte as claimed in claim 1, wherein the compound is selected from the group consisting of 1,3-dioxolan-2-onylmethyl allyl sulfonate, 1,3-dioxolan-2-onylmethyl methyl sulfonate, 1,3-dioxolan-2-onylmethyl ethyl sulfonate, 1,3-dioxolan-2-onylmethyl propyl sulfonate, 1,3-dioxolan-2-onylmethyl butyl sulfonate, 1,3-dioxolan-2-onylmethyl pentyl sulfonate, 1,3-dioxolan-2-onylmethyl hexyl sulfonate, 1,3-dioxolan-2-onylmethyl cyclopentyl sulfonate, 1,3-dioxolan-2-onylmethyl cyclohexyl sulfonate, 1,3-dioxolan-2-onylmethyl cycloheptyl sulfonate, 1,3-dioxolan-2-onylmethyl trifluoromethyl sulfonate, 1,3-dioxolan-2-onylmethyl trifluoroethyl sulfonate, 1,3-dioxolan-2-onylmethyl benzyl sulfonate, 1,3-dioxolan-2-onylethyl allyl sulfonate, 1,3-dioxolan-2-onylethyl methyl sulfonate, 1,3-dioxolan-2-onylethyl cyclopentyl sulfonate, 1,3-dioxolan-2-onylethyl cyclohexyl sulfonate, 1,3-dioxolan-2-onylethyl trifluoromethyl sulfonate, 1,3-dioxolan-2-onylethyl trifluoroethyl sulfonate, 1,3-dioxolan-2-onylethyl benzyl sulfonate, 1,3-dioxan-2-onyl-4-methyl allyl sulfonate, 1,3-dioxan-2-onyl-4-methyl methyl sulfonate, 1,3-dioxan-2-onyl-4-methyl cyclopentyl sulfonate, 1,3-dioxan-2-onyl-4-methyl cyclohexyl sulfonate, 1,3-dioxan-2-onyl-4-methyl trifluoromethyl sulfonate, 1,3-dioxan-2-onyl-4-methyl trifluoroethyl sulfonate, 1,3-dioxan-2-onyl-4-methyl benzyl sulfonate.

4. The non-aqueous electrolyte as claimed in claim 1, wherein the compound is used in an amount of 0.1~30 parts by weight per 100 parts by weight of the electrolyte.

5. A secondary battery comprising a cathode, an anode and a non-aqueous electrolyte as claimed in claim 1.

6. The secondary battery as claimed in claim 5, wherein the compound having both a sulfonate group and a cyclic carbonate group is represented by the following Formula 1:

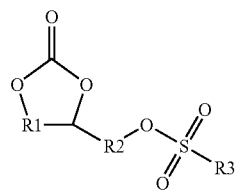

[Formula 1]

wherein each of R1 and R2 independently represents a $C_1$~$C_6$ alkylene group optionally containing a $C_1$~$C_6$ alkyl group or $C_2$~$C_6$ alkenyl group introduced thereto; R3 is selected from the group consisting of a hydrogen atom, $C_1$~$C_{20}$ alkyl group, $C_3$~$C_8$ cyclic alkyl group, $C_2$~$C_6$ alkenyl group, halo-substituted alkyl group, and benzyl group.

* * * * *